(12) United States Patent
Nelson

(10) Patent No.: US 9,945,753 B2
(45) Date of Patent: Apr. 17, 2018

(54) CARGO LOADING TRAILER

(75) Inventor: Donald M. Nelson, Fair Oaks, CA (US)

(73) Assignee: United Aeronautical Corp., North Hollywood, CA (US)

( * ) Notice: Subject to any disclaimer, the term of this patent is extended or adjusted under 35 U.S.C. 154(b) by 335 days.

(21) Appl. No.: 12/687,085

(22) Filed: Jan. 13, 2010

(65) Prior Publication Data

US 2010/0176961 A1 Jul. 15, 2010

Related U.S. Application Data

(60) Provisional application No. 61/144,378, filed on Jan. 13, 2009.

(51) Int. Cl.

| | |
|---|---|
| G08B 21/00 | (2006.01) |
| B60P 1/04 | (2006.01) |
| B62B 1/00 | (2006.01) |
| B65F 3/26 | (2006.01) |
| G01M 1/12 | (2006.01) |
| B60P 1/64 | (2006.01) |
| B60P 1/52 | (2006.01) |
| B60P 1/16 | (2006.01) |

(52) U.S. Cl.
CPC ............... *G01M 1/125* (2013.01); *B60P 1/16* (2013.01); *B60P 1/52* (2013.01); *B60P 1/6454* (2013.01)

(58) Field of Classification Search
CPC ........ G01M 1/125; B64D 1/16; B60P 1/6454; B60P 1/16; B60P 1/52; B60D 1/00; B60D 1/04; B65D 90/143

USPC .......... 340/689, 635; 700/279; 414/10, 499, 414/343, 438, 478, 480, 482, 494, 563, 414/812; 701/1, 70, 151; 169/51, 46, 53

See application file for complete search history.

(56) References Cited

U.S. PATENT DOCUMENTS

| | | | | |
|---|---|---|---|---|
| 3,944,096 | A * | 3/1976 | Carder | B60P 1/02 |
| | | | | 414/345 |
| 4,195,693 | A * | 4/1980 | Busch | A62C 3/0228 |
| | | | | 169/53 |
| 4,275,753 | A * | 6/1981 | Williams | F16K 7/06 |
| | | | | 137/38 |
| 4,611,816 | A * | 9/1986 | Traister | B65D 90/143 |
| | | | | 280/43.2 |
| 4,655,667 | A * | 4/1987 | Plumb et al. | 414/343 |
| 4,835,365 | A * | 5/1989 | Etheridge | H01R 43/00 |
| | | | | 200/61.52 |
| 4,988,974 | A * | 1/1991 | Fury et al. | 340/431 |
| 5,373,153 | A * | 12/1994 | Cumberledge et al. | 250/231.1 |
| 5,755,163 | A | 5/1998 | Coats | |
| 5,873,694 | A * | 2/1999 | Osborn et al. | 414/815 |
| 5,955,713 | A * | 9/1999 | Titus | H01H 35/02 |
| | | | | 200/277 |
| 5,967,733 | A * | 10/1999 | Cash | B60P 1/28 |
| | | | | 414/483 |
| 6,065,621 | A * | 5/2000 | Fatemi et al. | 212/301 |

(Continued)

*Primary Examiner* — Hoi Lau
(74) *Attorney, Agent, or Firm* — Tsircou Law, P.C.

(57) ABSTRACT

A cargo loading system for loading freight into or out of the cargo hold, the system comprising: a tilt control means which can be actuated by control signals in such a way that variances in tilt of a palletized load can be immediately righted; a control panel for actuation by personnel; a power source to the control panel; and a trailer base connected to the tilt control means for accepting freight.

10 Claims, 4 Drawing Sheets

(56) References Cited

U.S. PATENT DOCUMENTS

| | | | |
|---|---|---|---|
| 6,206,476 B1* | 3/2001 | Welton | B60P 1/283 298/1 B |
| 6,308,642 B1 | 10/2001 | Branam et al. | |
| 6,360,876 B1* | 3/2002 | Nohl et al. | 198/588 |
| 6,430,366 B1* | 8/2002 | Mizutani | E03D 9/08 392/449 |
| 6,695,287 B1* | 2/2004 | De Boer | B60P 3/122 254/10 C |
| 6,695,555 B2 | 2/2004 | Eilenstein et al. | |
| 6,867,702 B2 | 3/2005 | Huber et al. | |
| 6,892,677 B1* | 5/2005 | Livingston | A01K 45/005 119/845 |
| 7,100,827 B2 | 9/2006 | Olin et al. | |
| 7,165,627 B2 | 1/2007 | Hutter et al. | |
| 7,391,311 B2 | 6/2008 | Haskew | |
| 7,802,958 B2* | 9/2010 | Garcia | B60P 1/52 414/482 |
| 7,950,675 B1* | 5/2011 | Quenzi | B60G 17/02 180/209 |
| 8,081,298 B1* | 12/2011 | Cross | F41G 1/473 356/3.01 |
| 2001/0015156 A1 | 8/2001 | Branam et al. | |
| 2002/0005150 A1 | 1/2002 | Taylor et al. | |
| 2002/0088898 A1* | 7/2002 | Lucy | 244/17.11 |
| 2003/0129046 A1* | 7/2003 | Simpson | B60P 1/6454 414/343 |
| 2004/0105743 A1* | 6/2004 | Franklund | B60P 3/122 414/482 |
| 2004/0151564 A1* | 8/2004 | Waguespack | B60P 1/16 414/491 |
| 2005/0017131 A1* | 1/2005 | Hale | A62C 3/0228 244/136 |
| 2005/0029728 A1 | 2/2005 | Kuroda | |
| 2005/0072880 A1* | 4/2005 | Nolan | B64D 1/16 244/136 |
| 2005/0132937 A1 | 6/2005 | Branam | |
| 2005/0151448 A1* | 7/2005 | Hikida | G01C 9/06 310/338 |
| 2005/0226707 A1* | 10/2005 | Quenzi | B60P 1/02 414/482 |
| 2006/0077375 A1* | 4/2006 | Vermillion | F41G 1/473 356/4.01 |
| 2006/0182580 A1* | 8/2006 | Petersen | B60P 1/6454 414/538 |
| 2006/0260826 A1* | 11/2006 | Hutter | A62C 3/0242 169/51 |
| 2008/0056869 A1* | 3/2008 | Cullum | B60P 1/6454 414/480 |
| 2008/0056870 A1* | 3/2008 | Cullum | B60P 1/6454 414/494 |
| 2008/0056873 A1* | 3/2008 | Cullum | B60P 1/6454 414/563 |
| 2008/0213074 A1* | 9/2008 | Garcia | B60P 1/52 414/482 |
| 2008/0219821 A1* | 9/2008 | Marmur | B60P 1/6454 414/478 |
| 2008/0319589 A1* | 12/2008 | Lee et al. | 701/1 |
| 2009/0257854 A1* | 10/2009 | Wright | B60P 1/6454 414/499 |
| 2010/0176961 A1* | 7/2010 | Nelson | G01M 1/125 340/689 |
| 2011/0002756 A1* | 1/2011 | Carr et al. | 414/10 |
| 2011/0037602 A1* | 2/2011 | Chrosny | H01L 31/02021 340/635 |
| 2011/0168414 A1* | 7/2011 | Nelson | A62C 3/0228 169/46 |
| 2013/0016321 A1* | 1/2013 | Duelli | G02B 27/48 353/20 |
| 2015/0241172 A1* | 8/2015 | Roman | F41G 1/473 235/404 |
| 2016/0221761 A1* | 8/2016 | Walder | B65G 17/126 |

* cited by examiner

CARGO LOADING TRAILER

REFERENCE TO RELATED APPLICATION

This application claims the benefit of U.S. Provisional Patent Application No. 61/144,378, filed Jan. 13, 2009, the complete disclosure of which is incorporated herein, in the entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND OF THE INVENTION

Field of the Invention

This invention describes a freight-loading system adapted particularly for use in loading a portable airborne firefighting system (AFFS) to the fuselage or cargo hold of an aircraft.

Description of Related Art

U.S. Pat. No. 7,165,627, discloses a portable AFFS that is adapted for use in a host aircraft fuselage. The firefighting apparatus includes a pressurizeable retardant tank disposed in the interior of the host aircraft, the retardant tank being capable of roll-on and roll-off installation, an ejection tube in fluid communication with the retardant tank, and a door plug for mounting within a fuselage orifice in the host aircraft. The door plug provides for fluid communication of retardant from the retardant tank through the ejection tube to the exterior of the host aircraft. At least one sensor is operably connected to the firefighting apparatus to effect user-discernable data for effecting retardant delivery. The system is secured to a pallet which is loaded on and off the fuselage in a conventional manner.

In the loading and unloading of an AFFS, a large holding tank, pressurizing system, controls, and various pipes and structural components are first secured to a pallet structure. The resulting pallet is very large, bulky and cumbersome to move in an out.

U.S. Pat. No. 6,867,702, describes a freight-loading system located within the cargo hold of an aircraft for enhanced operating safety. The freight-loading system comprises a plurality of power drive units (PDUs), which can be actuated by control signals in such a way that items of freight can be maneuvered into or out of the cargo hold as well as within it. The PDUs are connected by control leads to control panels for actuation by personnel. A control maintenance computer (CMC) is provided and connected to the PDUs and the control panels, and is so designed that status information from the PDUs and the control panels can be read out and that the PDUs and/or the control panels are controllable by the CMC. This system is not adapted for, nor could it accommodate a bulky structure that is intended to occupy a substantial portion of the fuselage.

None of the prior art approaches have been able to improve the loading of a large palletized structure such as a portable AFFS safely and quickly.

SUMMARY OF THE INVENTION

This invention provides a palletized structure loading system that includes a tilt control to prevent tilt and maintain horizontal and vertical alignment of the pallet during loading.

This invention also provides a cargo loading system for loading freight into or out of the cargo hold, the system comprising: a tilt control means which can be actuated by control signals in such a way that variances in tilt of a palletized load can be immediately righted; a control panel for actuation by personnel; a power source to the control panel; and a trailer base connected to the tilt control means for accepting freight.

The cargo loading system may have the cargo loaded to a pallet.

The cargo loading system can be adapted particularly for loading and unloading an AFFS system.

These and other features and advantages of this invention are described in, or are apparent from, the following detailed description of various exemplary embodiments of the apparatus and methods according to this invention.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE INVENTION

Figure 1:
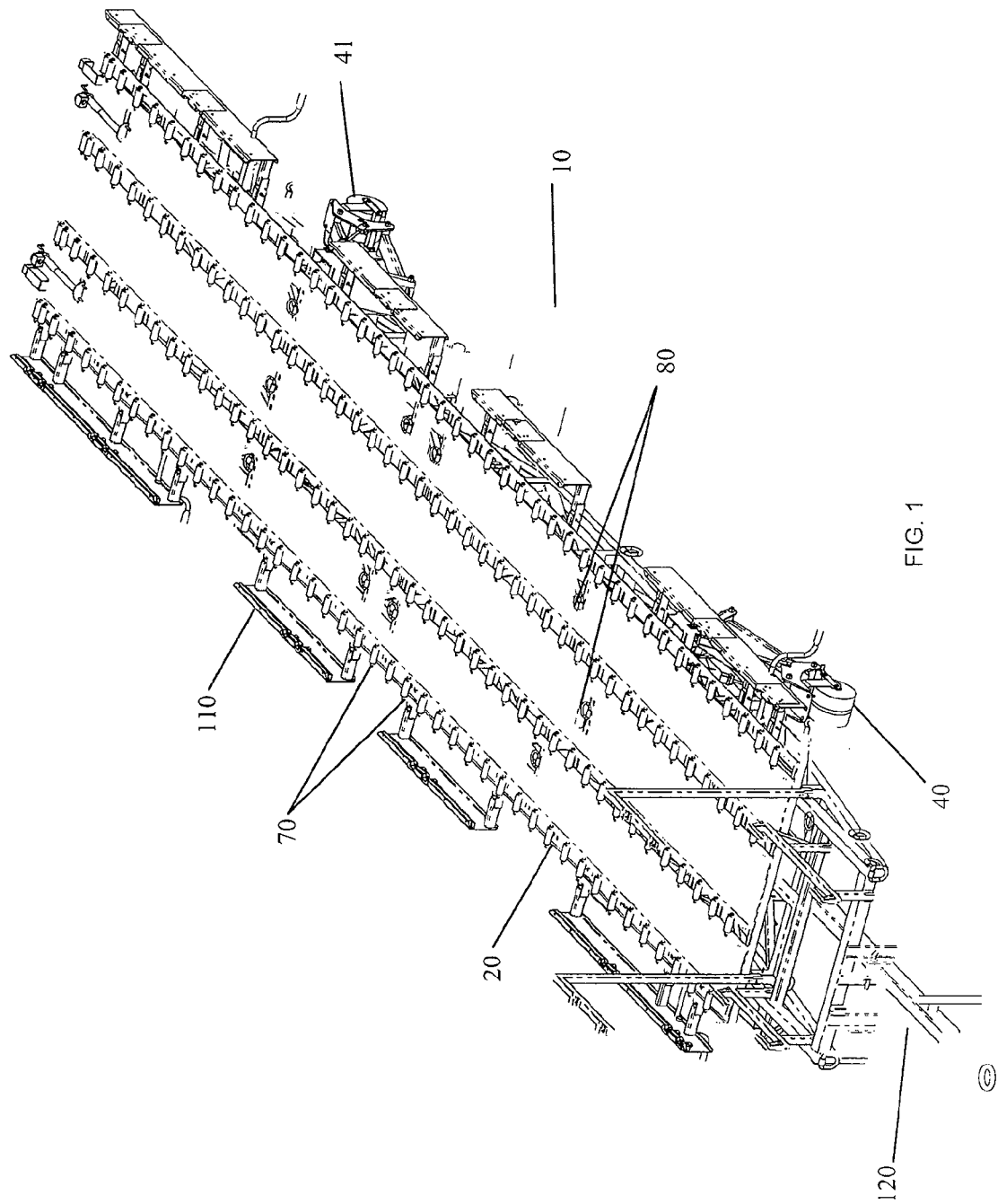
FIG. 1 depicts perspective views of the trailer components.

The products and methods of the present invention provide an improved cargo loading trailer adapted for the loading of a large palletized structure such as a mobile or portable AFFS both safely and quickly from the fuselage of an aircraft.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In the loading and unloading of an AFFS, it is necessary to deposit a bulky load within the fuselage of an aircraft, typically including a large holding tank, pressurizing system, controls, and various pipes and structural components. In the past, this has been accomplished by first securing the components to a pallet structure, which is large, bulky and cumbersome to move in an out of the aircraft fuselage, and then using conventional lifting operations to lift the pallet to the fuselage.

In reference now to the Figures appended herewith, the present invention provides a palletized structure loading system 10 that incorporates tilt control means to prevent tilt and maintain horizontal and vertical alignment of a pallet during loading, providing enhanced control and safety of the operation of loading palleted freight into or out of the cargo hold or fuselage of an aircraft.

The components of the cargo loading system 10 include a trailer base 20 for accepting palleted freight, which is connected to a tilt control means 30 which can be actuated by control signals in such a way that variances in tilt of a palletized load can be immediately righted. The system also includes a power source and a control panel for actuation by personnel.

Tilt switches, for instance the use of an inclinometer or the like, are adapted to maintain level in a palletized AFFS trailer system. The tilt switches allow control of four vertically articulated casters 40, 41, 42 and 43, that are hydraulically actuated are used to maintain proper orientation in loading in response to signals from the tilt control means 30. A combination of single axis or a dual axis tilt sensor may be utilized.

Figure 2:
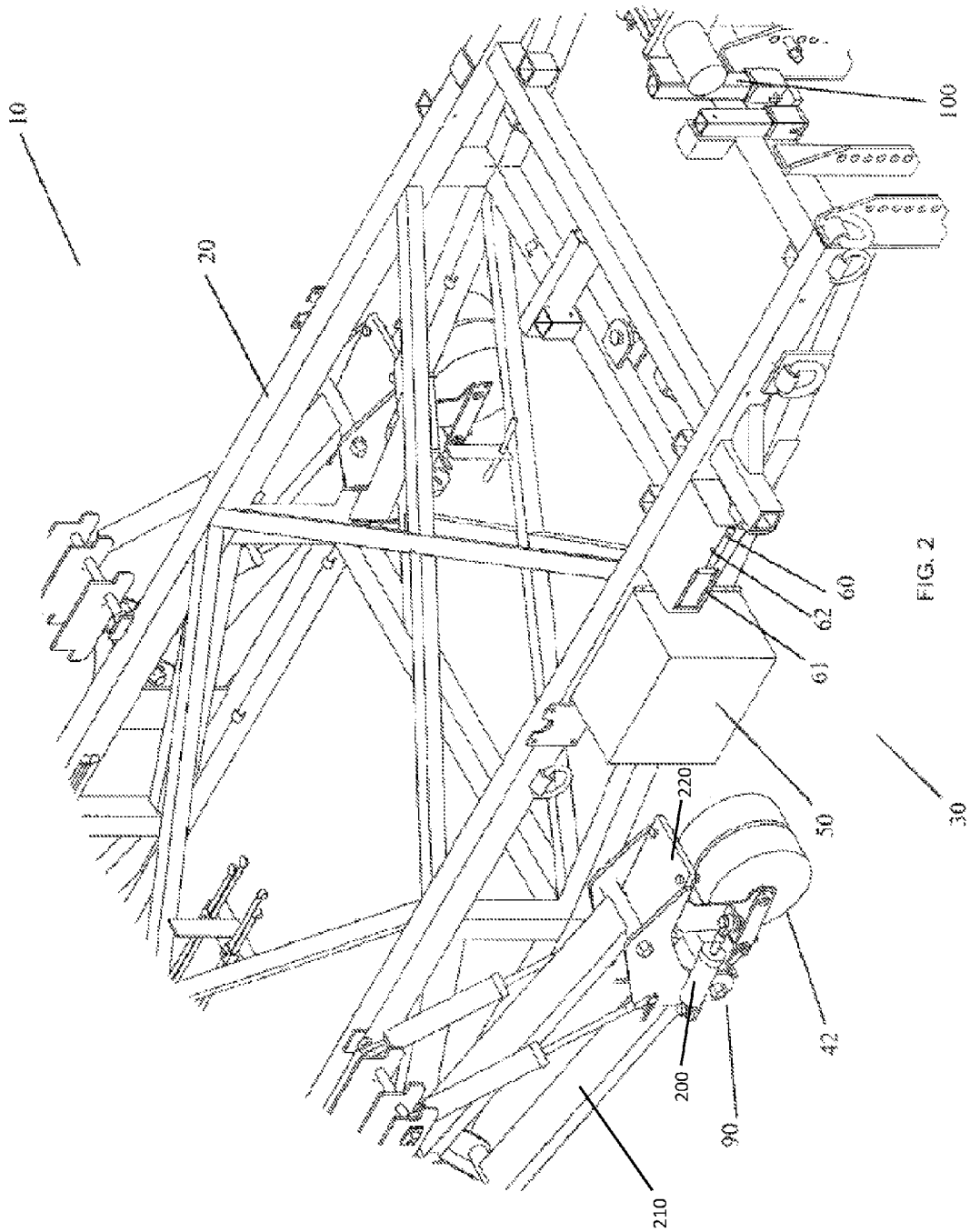
FIG. 2 depicts the trailer in perspective and showing details of the actuators.
Figure 3:
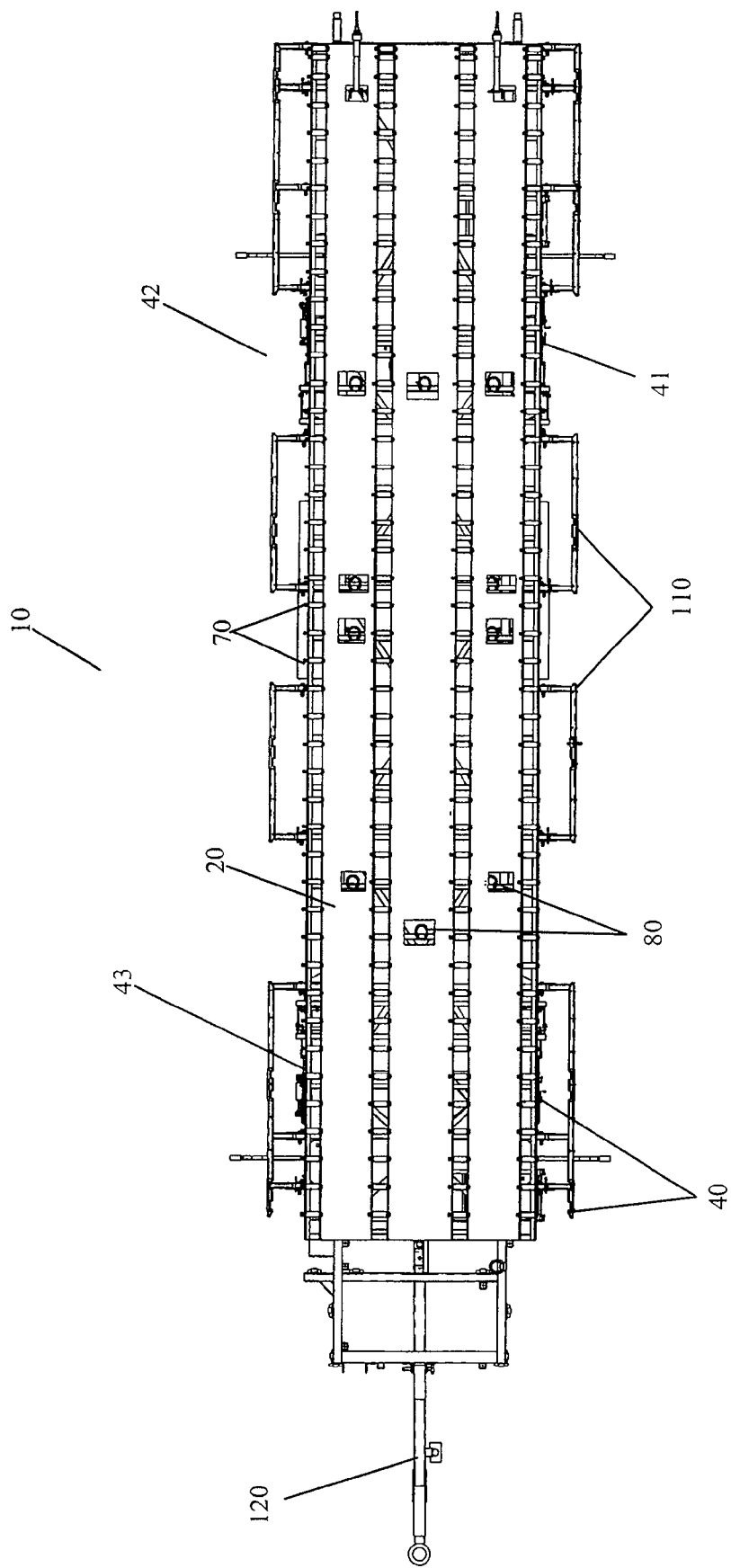
FIG. 3 is a top plan view of the cargo loading trailer showing location of the tilt switches.
Figure 4:
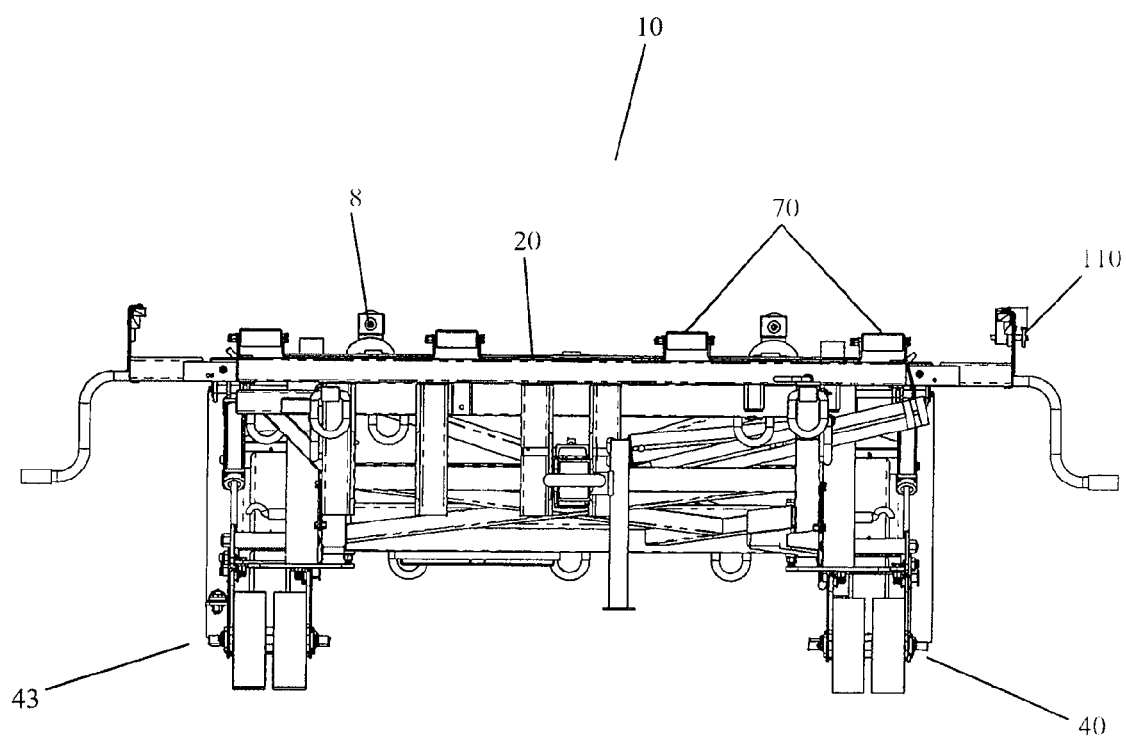
FIG. 4 is a front end view of the trailer.

As seen in FIG. 2, the tilt control means 30 may include a control box 50, such as the Loadmaster control box 50, which allows single point control of height adjustment and steering capability. The trailer can also be equipped with an external aircraft 28 V DC ground power receptacle 60.

Twin 12 V batteries can be used within (not shown) to supply power to the winch and hydraulic system. The controls may also include a 28 V DC auxiliary ground power receptacle 61. A toggle switch 62 may be provided for switching between on and off positions for the power.

In one adaptation, four tilt switches are deployed within the control box 50, such as Fredericks Programmable Tilt Switch, model no. 0729-1727-99, a non-mercury, single axis, programmable tilt switch. Such a switch utilizes a +4.5 to +28 volt single power supply, with a +45 degree sensing range. The Fredericks Programmable Tilt Switch also utilizes unidirectional and bi-directional open collector outputs.

A preferred Fredericks Programmable Tilt Switch is a combination microprocessor based electronics and TrueTilt™ dual axis tilt sensor in a compact, high-impact plastic case. The design provides the user with anon-mercury, field settable switch solution for many applications. The tilt switch assembly can be easily custom configured for a wide variety of angle range trip points, to avoid the wide hysteresis errors of most mercury and gravity ball switches over temperature. The simple design makes it cost effective for prototype and production requirements.

Further adaptations may include a vehicle tip-over protection/warning, alarm system activation, structural threshold monitoring, and safety cut off switch.

The programming and operation of a Fredericks Programmable Tilt Switch allows each unit to be programmed to trip at any point within its angle range. This is accomplished very simply by applying power and inserting and removing a jumper at the starting and trip point. Unidirectional output will trip in one direction only. Bidirectional output will trip in both directions. The unit can be reprogrammed as often as necessary for any application.

The fore and aft steerable casters allow direct Loadmaster control. Preferably the system casters comprise aerospace grade rollers fitted with sealed bearings.

The use of flared ends and rollers 70 can be included to facilitate ease of loading of pallets onto the trailer base 20. Further, D-rings 80, allow the tying of the loaded pallet to the trailer base 20.

The system 10 also includes surge brakes 90 for towing safety (FIG. 2). Forward and aft stops can be provided to prevent cargo movement during transportation.

Optionally, an onboard 24-volt remote control winch 100 may provide for easing of the loaded pallets on and off of the trailer bed 20.

For safety purposes, it may be preferred to include reflective tape along exterior for night visibility. Also for safety purposes, side stops 110 are provided to keep the pallet on the trailer bed 20.

In operation, the tilt switches are used to limit the amount of tilt in the system 10 when raising or lowering the loaded trailer bed 20. After the trailer is moved to a loading position (for instance by using normal tires affixed beneath the trailer, not shown), the casters 40, 41, 42 and 43, attached to a corresponding leg 210 with a mounting frame 220, are lowered to the ground using corresponding legs 210, and then begin to raise the trailer bed 20 off of the tires to raise a loaded pallet to the proper height. After this, using hydraulic actuators 200 to control the orientation of the corresponding casters 41, 42, 43, and 44, the trailer system 10 is steered a final distance so that it is properly aligned with the aircraft.

The loaded system 10 is then winched from the trailer rollers 70 onto the aircraft rollers.

The trailer tongue 120 can also be used to control and manually steer the trailer by attaching it in a conventional manner.

The trailer system 10 may also be provided with four adjustable landing pads for safe, secure footing on varying grades and terrain.

The tilt control system 30, by inclinometer or switches or the like, provides a horizontal and vertical control to allow safe alignment of the trailer to a C-130 cargo aircraft for proper loading and unloading of the system.

The cargo loading trailer system 10 may also be used as a platform for AFFS storage, testing, pre-flight inspection, and transport.

The trailer 10 may be produced to be compatible with a particular cargo floor for air transportation, for instance a C-130 cargo floor.

Optionally, the cargo loading trailer can utilize fold-up sides to reduce the width for aircraft loading and crew egress. The fold up sides allows the cargo loading trailer to be used for a wide of range of logistical solutions.

Remote controlled steerable casters may be located on one or the other side of the trailer and assist in maneuvering the trailer.

A trailer built to the specifications exemplified can be used for transportation and storage of standard 463 L pallets or other variants not exceeding 108" in width.

A C-130 system can also be produced to be compatible with the Lockheed Martin L-382/L-100 and other rear loading cargo aircraft.

The cargo loading trailer can also be modified to accommodate most other aircraft with rear cargo loading, for example the Alenia C-27J, CASA C-295, CN-235 and Airbus A400M.

A secure storage box that is used to store loose items, i.e. pallet stops and tools, may be attached to the system 10.

Examples—Trailer Dimensions

The cargo loading system can be easily adapted particularly for loading and unloading an AFFS system for a C-130 fuselage. For such an application, trailer dimensions are as follows:

| | |
|---|---|
| Trailer Length | 551 inches approximately |
| Trailer Length with Extension | 595 inches approximately |
| Minimum Width | 99 inches approximately |
| Maximum Width | 113 inches approximately |

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A cargo loading system for loading freight into or out of the cargo hold, the system comprising:
   a trailer base sized to secure a pallet adapted to hold an AFFS unit;
   a plurality of support legs affixed to said trailer base in spaced relationship in fore and aft locations thereon;
   a plurality of steerable casters, each caster operatively coupled to a corresponding support leg of the plurality of support legs such that each casters can rotate about an axis of rotation perpendicular to the ground,
   a first set of hydraulic actuators coupled to the plurality of support legs to displace the plurality of casters from a stored orientation in which the casters are not in contact with the ground to a deployed orientation in which the castors contact the ground to raise the trailer base to a desired height;
   a second set of hydraulic actuators coupled to the plurality of casters to control the rotation of each caster about the axis of rotation for steerable control thereof; and
   a control panel assembly coupled to the trailer base and in operative communication with the first set and the second set of hydraulic actuators to provide a single point of control for height adjustment and steering capability of said casters by personnel, the control panel assembly having tilt control switches in operative communication to maintain horizontal and vertical alignment of the trailer base during height adjustment of the trailer base by vertical articulation of said casters.

2. The cargo loading system of claim 1, wherein the tilt switches utilizes unidirectional and bi-directional open collector outputs.

3. The cargo loading system of claim 2, wherein the tilt switch is a non-mercury, single axis, programmable tilt switch.

4. The cargo loading system of claim 1, wherein the control panel assembly further comprises a safety cut off switch system, activated manually or automatically by a tip-over protection warning system.

5. The cargo loading system of claim 1, wherein the cargo hold is for an aircraft.

6. The cargo loading system of claim 5, wherein the aircraft is a rear loading aircraft.

7. The cargo loading system of claim 1, wherein the trailer base has a length of at least about 551 inches.

8. The cargo loading system of claim 1, wherein the plurality of support legs include two support legs affixed in fore locations to said trailer base and two support legs affixed in aft locations to said trailer base.

9. The cargo loading system of claim 8, wherein the plurality of steerable casters include two steerable casters, each coupled to a corresponding support legs of the two support legs affixed in the fore locations to said trailer base.

10. The cargo loading system of claim 8, wherein the plurality of steerable casters include two steerable casters, each coupled to a corresponding support legs of the two support legs affixed in the aft locations to said trailer base.

* * * * *